(12) United States Patent  
Wiant (10) Patent No.: US 7,449,635 B2  
(45) Date of Patent: Nov. 11, 2008

(54) BUS JOINT ASSEMBLY

(75) Inventor: Jason P. Wiant, Bedford, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/682,439

(22) Filed: Mar. 6, 2007

(65) Prior Publication Data

US 2007/0207638 A1 Sep. 6, 2007

Related U.S. Application Data

(60) Provisional application No. 60/779,597, filed on Mar. 6, 2006.

(51) Int. Cl.  
*H02G 5/00* (2006.01)

(52) U.S. Cl. .................. 174/68.2; 361/648; 439/213; 174/70 B (58) Field of Classification Search .......... 361/605, 361/611, 637–640, 648; 439/213; 174/68.2, 174/88 B, 70 B, 99 B; 211/26; 312/265.1–265.4, 312/223

See application file for complete search history.

(56) References Cited

U.S. PATENT DOCUMENTS

| 3,559,148 | A | * | 1/1971 | Hafer | 439/213 |
| 5,982,611 | A | | 11/1999 | Campbell | 361/664 |
| 6,040,976 | A | * | 3/2000 | Bruner et al. | 361/611 |
| 6,111,745 | A | | 8/2000 | Wilkie | 361/60.5 |
| 6,190,081 | B1 | * | 2/2001 | Besserer et al. | 403/231 |
| 6,870,103 | B1 | * | 3/2005 | Wiant et al. | 174/68.2 |
| 6,888,066 | B1 | * | 5/2005 | Wiant et al. | 174/68.2 |
| 7,281,633 | B2 | * | 10/2007 | Hartman et al. | 211/26 |
| 2004/0100785 | A1 | | 5/2004 | Josten | 361/828 |
| 2005/0061534 | A1 | | 3/2005 | Wiant | 174/68.2 |
| 2005/0077072 | A1 | | 4/2005 | Wiant | 174/68.2 |

OTHER PUBLICATIONS

PCT International Search Report, mailed Aug. 28, 2007.

* cited by examiner

*Primary Examiner*—Michael C Zarroli (57) ABSTRACT

A bus joint assembly for use in switchgear equipment having bus bars joined together at a bus joint and for joining vertical and horizontal buses. The bus joint connector comprises a connector, nut plate, connecting and supporting pins as well as a splice bus connector. The bus joint connector with integrated fixture pins locates and supports horizontal buses to vertical buses during assembly.

26 Claims, 9 Drawing Sheets

BUS JOINT ASSEMBLY

CROSS REFERENCE TO RELATED APPLICATIONS

This application claims priority to U.S. Provisional Patent Application No. 60/779,597 filed Mar. 6, 2006, entitled "Bus Joint Interface" is incorporated fully herein by reference.

FIELD OF THE INVENTION

The present invention relates generally to the field of electrical switchboards and panel boards having bus bars, and more specifically to a bus joint connector for facilitating the assembly of bus bars generally found in switchgear assemblies.

BACKGROUND OF THE INVENTION

Switchgear assemblies, switchboards and panelboards are general terms which cover metal enclosures, housing switching and interrupting devices such as fuses, and circuit breakers, along with associated control, instrumentation and metering devices. Such assemblies typically include associated bus bars, interconnections and supporting structures used for the distribution of electrical power. Low voltage switchgear and switchboards operate at voltages up to 600 volts and with continuous currents up to 5000 amps or higher. Such devices are also designed to withstand short circuit currents ranging up to 200,000 amps (3 phase RMS symmetrical).

Typical switchgear equipment is composed of a lineup of several metal enclosed sections. Each section may have several circuit breakers stacked one above the other vertically in the front of the section with each breaker being enclosed in its own metal compartment. Each section has a vertical or section bus which supplies current to the breakers within the section via short horizontal branch buses. The vertical bus bars in each section are supplied with current by a horizontal main bus bar that runs through the lineup of metal enclosed sections. A typical arrangement includes bus bars for each electrical phase of a multiple phase system which may include three power phases and a neutral.

The bus bars typically are joined by bus bar joints in the switchgear line-up. Bus bar joints typically are assembled with bolts that must be accessible for routine maintenance, for example, tightening or replacing bus bars. Bus bar assemblies typically increase in thickness as the current rating of the switchgear equipment increases. It is also typical to provide insulation of various components within a switchgear enclosure including a cover of the bus bar joints.

Installation of bus bars are rather labor intensive and require careful assembly. A problem faced during installation is aligning and supporting the horizontal bus bars to the vertical bus bars in an efficient and expeditious manner. The present invention facilitates the installation process by provisioning a means of aligning and supporting adjacent horizontal bus bars as they are being installed on the vertical bus bars.

Thus, there is a need for a bus joint assembly for use in switchgear equipment that will align and support bus bars. There is a further need for a bus joint assembly that may be used with various bus bar configurations. There is an additional need for a bus joint assembly that can facilitate the installation process.

SUMMARY

In the installation of a bus joint assembly, a bus joint connector is used which facilities the installation process. Because of the use of supporting pins, horizontal bus bars are horizontally aligned and supported while being fastened to the vertical bus bar.

Horizontal buses connect to vertical buses through a bus joint assembly. A typical bus joint assembly is a bolted joint comprised of the following components: splice bus, bus joint connector and hardware. A horizontal bus is sandwiched between the splice bus and bus joint connector. The fixture pins are connected to the bus joint connector. The bus joint connector with connected fixture pins serves two functions: (1) to locate the horizontal bus on the bus joint connector; and (2) to support and align the horizontal bus.

The bus joint connector with fixture pins solves the assemblability issue of having to locate, align and support the horizontal bus while assembling the splice bus and hardware in the same step. The advantage of having the horizontal bus located, aligned and supported allows a single installer to focus on assembling just the splice bus and hardware. This greatly improves assembly process time.

A disadvantage of known main bus joint designs is the lack of horizontal support while splice buses are fastened. For the most part, current installation practices require that the installer locate, align, support, assemble and secure the main bus joint components in one step. This process is difficult and time consuming for a single installer.

Although the embodiments described herein focus on the use of a horizontal main bus" in the form of a channel shaped bus bar, it should be understood that other forms of horizontal bus bars may be used. More specifically, the bus joint connector with fixture pins described below can work with bus bars having other geometric shapes like flat bus bars.

DETAILED DESCRIPTION

Figure 1:
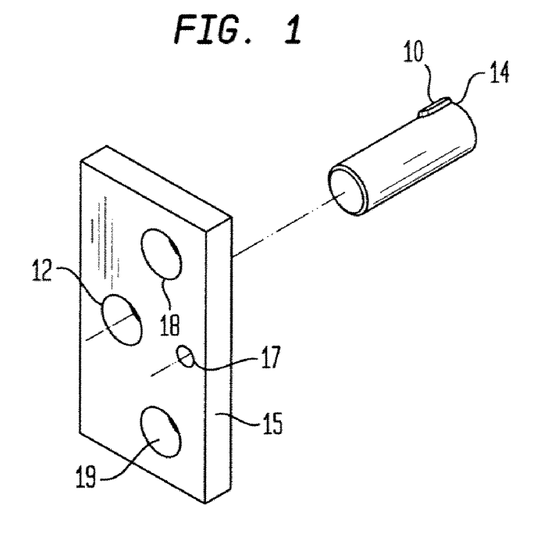
FIG. 1 is an illustration of a nut plate and associated fixture pin and fin.
Figure 1A:
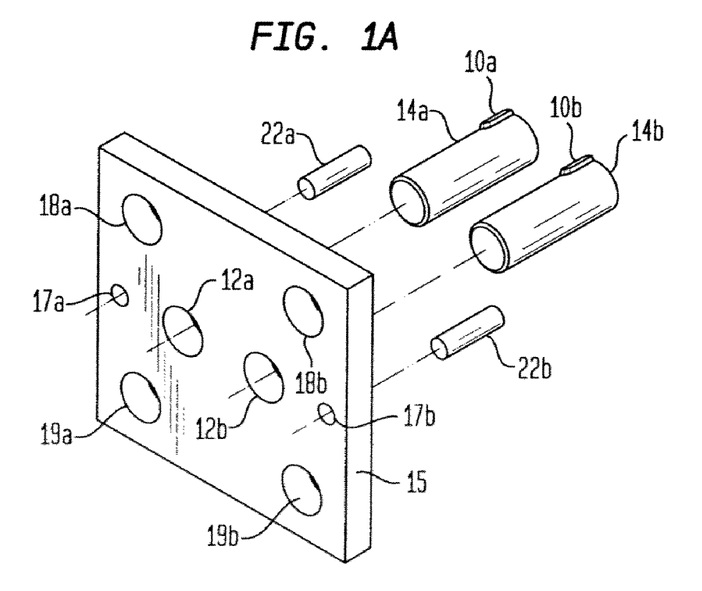
FIG. 1a is an illustration of an integral double nut plate and associated roll pins and fixture pins.
Figure 2:
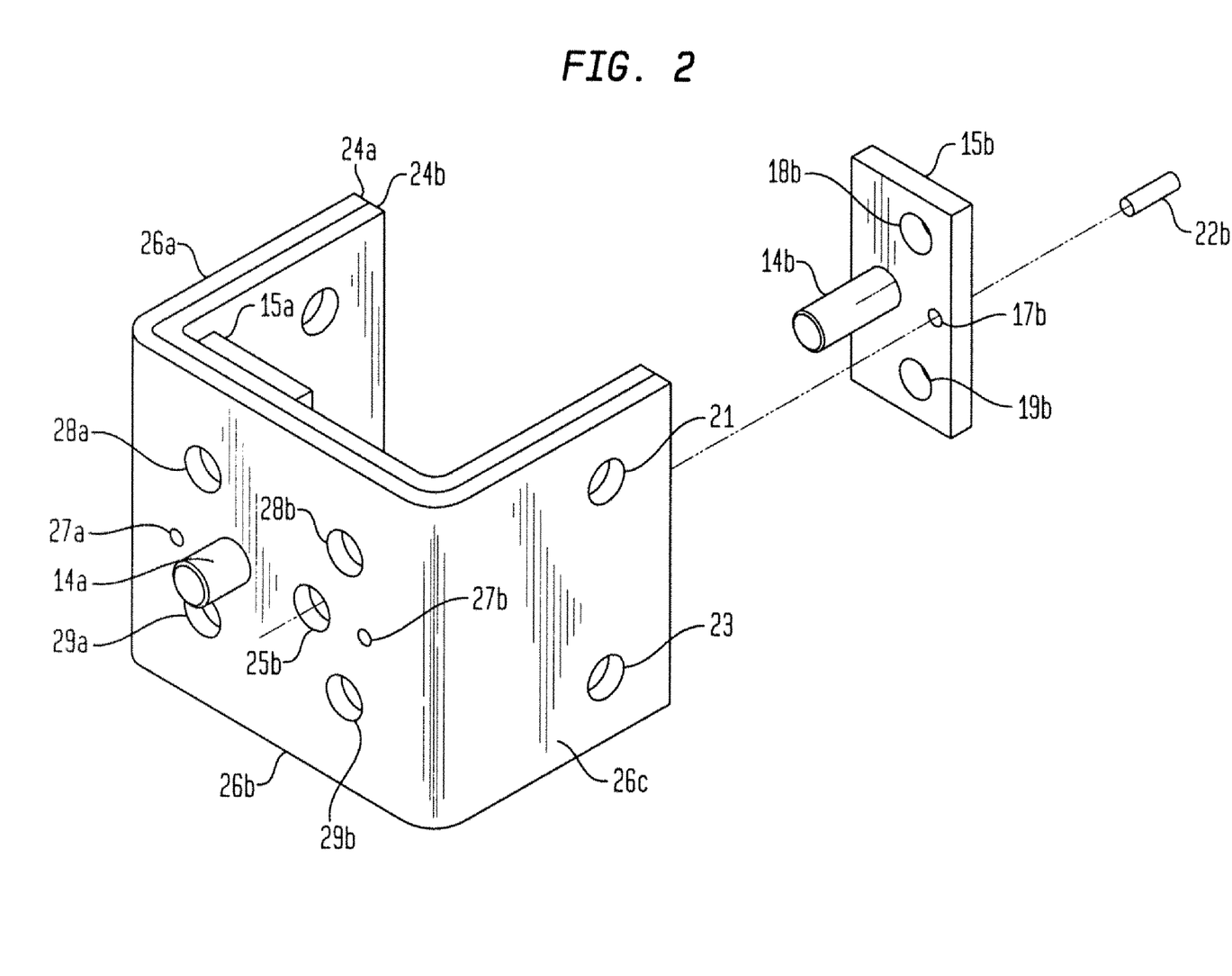
FIG. 2 is an illustration of a U-shaped bus joint connector, nut plates, fixture pins and roll pins.

Shown in FIG. 1 is a nut plate 15 for use with the bus joint connector 24 shown in FIG. 2. The nut plate 15 is preferably made of metal such as steel although other supportive materials such as, cooper, aluminum, or an alloy may be used. Steel is an often preferred material since it is very strong and performs very well in maintaining thread integrity.

The nut plate arrangement is preferred over a single bolt-single nut design arrangement since there are fewer parts to handle, and it is easier to assemble when access is near impossible. The nut plate 15 is shown in a rectangular form for illustration purposes only. The shape of the nut nut plate 15 may take whatever form is most economical or structurally appropriate. For example the nut plate 15 may be made in a circular disk shaped form when stamping is used to mass produce nut plate 15.

Figure 1B:
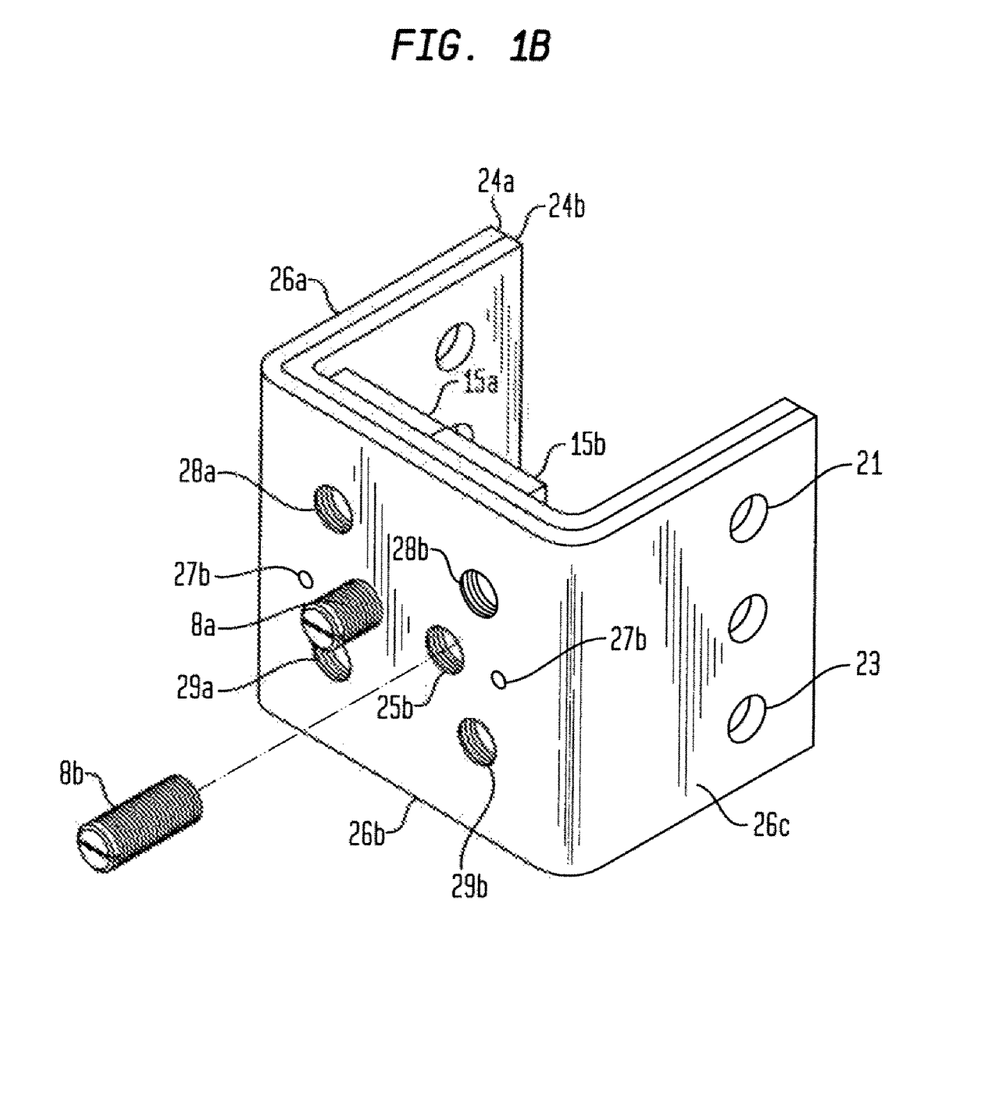
FIG. 1b is an illustration of a U-shaped bus joint connector having a removal fastener.
Figure 1C:
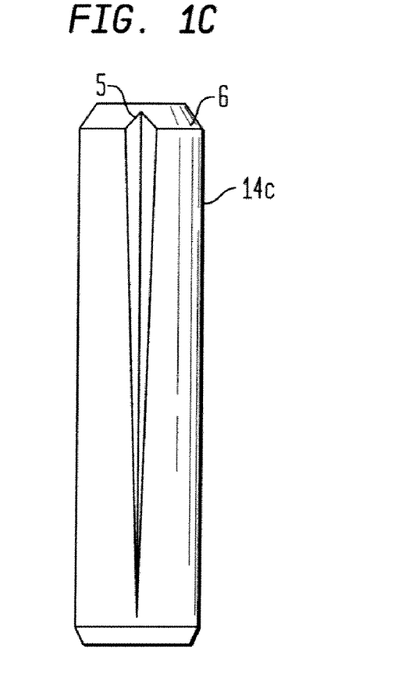
FIG. 1c is an illustration of a grooved pin.
Figure 1D:
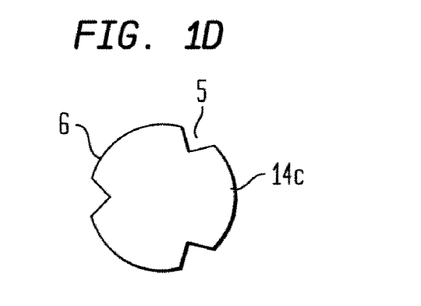
FIG. 1d is an illustration of the grooved pin of FIG. 1c depicting a cross-section having grooves and raised portions.
Figure 1E:
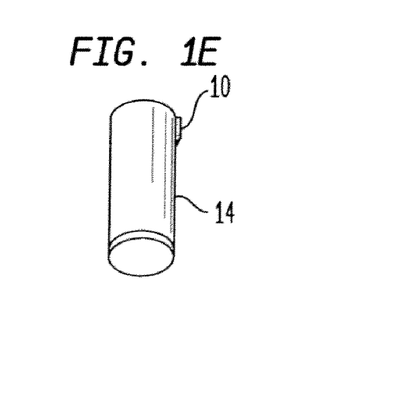
FIG. 1e is an illustration of a fixture pin with fin.

The nut plate 15 in its preferred form comprises at least one hole 12 through which a fixture pin 14 may be engaged. As will be discussed in more detail below, the nut plate 15 and roll pin 22b function to align and support the layers 24a, 24b of the bus joint connector 24. The nut plate 15 and the fixture pin 14 function to align and provide structural support to the horizontal bus bars 34, 36 during installation. In one embodiment of the present invention, the fixture pin 14 is mateably inserted and held in place in a friction fit within hole 12. Fixture pin 14 mates with hole 12 and passes through clearance hole 25 with approximately a 1/16 inch tolerance. To better secure the fixture pin 14 with the nut plate 15, the fixture pin 14 may have one or more raised fins 10 as shown in FIG. 1e. Moreover, the longitudinal cross-section may increase towards fin 10 so as provide a more secure friction fit. The raised fin(s) 10 is used to enhance the friction fit when the fixture pin 14 is inserted into the hole 12. It should be understood that reference to fin, does not limit the fin to any particular form or structure. The term fin should be understood to mean, a raised portion on the surface of fixture 14 so as to enhance a friction fit in hole. 12.

Alternatively, fixture pin 14 may be configured as a grooved pin 14c formed by a swaging operation in which one or more tools penetrate the nominal diameter of the surface of metal pin 14c. For example and as shown in FIGS. 1c and 1d, three tools may be use at predetermined 120° intervals. The penetration displaces a controlled amount of metal to each side of the grooving tool, forming a raised or expanded portion 6 along the side of each groove 5 causing the outer circumference at the grooved portion to slightly increase. In this manner, the insertion of the grooved pin within the hole 12 of the nut plate 15 will result in a friction fit. Moreover, it should be understood that the fixture pin 14 may or may not contain a fin 10 or groove 5. Fixture pin 14 may only have a tapered longitudinal surface such that insertion of the narrower end through hole 12 will result in a friction fit when inserted. Fixture pin 14, may have a uniform cross-sectional area, provided that it provides a friction fit with hole 12. Other means of fastening the fixture pin 14 may be readily apparent to those skilled in the art without departing from the spirit and scope of the present invention.

In addition, nut plate 15 may contain one or more retention holes 18, 19 through which retention hardware such as screws, bolts, washers and other fastening hardware may be inserted and used to attach switchgear equipment. Nut plate 15 may also have a hole 17 to accommodate fastening hardware such as roll pin 22. In the embodiment shown in FIG. 1, the roll pin 22 is used to secure the nut plate 15 to the bus joint connector 24.

As shown in FIG. 2, the fixture pin 14 and the roll pin 22 are inserted in corresponding holes within the bus joint connector 24. The bus joint connector 24 is preferably made of any electrically conductive material such as cooper or aluminum. Although, the bus joint 24 is preferably made as a singular piece, the bus joint 24 as shown in FIG. 2, may be constructed of two correspondingly similar layers nested 24a, 24b whenever manufacturing equipment availability and/or the costs associated with such manufacture render a one piece design, unfeasible. For illustrative purposes, the bus joint connector 24 will be shown as a two piece design. A two piece design facilitates the manufacturing of bus joint connector 24 since a thinner gauge metal may be used which is more malleable.

The two layers 24a, 24b of the bus joint connector 24 are layered on top of each other (nested) and are connected to the nut plate 15 by roll pin 22. In the present embodiment, the two layers 24a, 24b are U-shaped so as to substantially wrap-around and electrically connect vertical bus bars 30a, 30b. In assembling the bus joint connector 24 and the nut plate 15, roll pin 22 is inserted in hole 27 of the bus joint connector 24 and fixture pin 14 passes through hole 25. The same structural configurations applicable to fixture pin 14 are applicable to roll pin 22. As shown in FIG. 2, the center face 26b of bus joint 24 comprises two sets of holes (25a, 25b, 27a, 27b, 28a, 28b, 29a, 29b) so as to accommodate a pair of nut plates 15a, 15b with associated fixture and roll pins 14, 22 as well as associated fastening hardware 45a, 45b.

In FIG. 2, two nut plates 15a, 15b are attached to the bus joint connector 24 by inserting corresponding fixture pins 14a, 14b and roll pins 22a, 22b. Nut plate 15a is shown already in position and against the back center face 26b of layer 24b while fixture pin 14a is shown extending through hole 25a. Once the bus joint 24 is fastened to the vertical bus bars 30a, 30b, fixture pins 14a & 14b are used to support and align horizontal bus bars 34, 36. Alternatively, one larger nut plate 15 as shown in FIG. 1b comprising an integrated version of two nut plates 15a, 15b may be used. Each side of nut plate 15 comprises corresponding holes 17a, 17b, 12a, 12b, 19a, 19b and associated fixture and roll pins 14a, 14b, 22a, 22b. The use of a single larger nut plate 15 will facilitate assembly and better align and support the other assembly components.

Alternatively and as shown in FIG. 1b, the bus joint connector 24 may use removable fixture pins 8a, 8b such as slot head set screws, and other fastening means. The removable fixture pins 8a, 8b pass through holes 25a, 25b and engage holes 12a, 12b of the nutplate(s) 15. The holes 12a, 12b are in this embodiment threaded to facilitate removal. It should be understood however, that fixture and roll pins 14, 22 and holes 25a, 25b and holes 12a, 12b as described above may also be used in other bus joint connector forms such as the L-shaped bus joint connector shown in FIG. 5 without departing from the scope of the invention.

Figure 3:
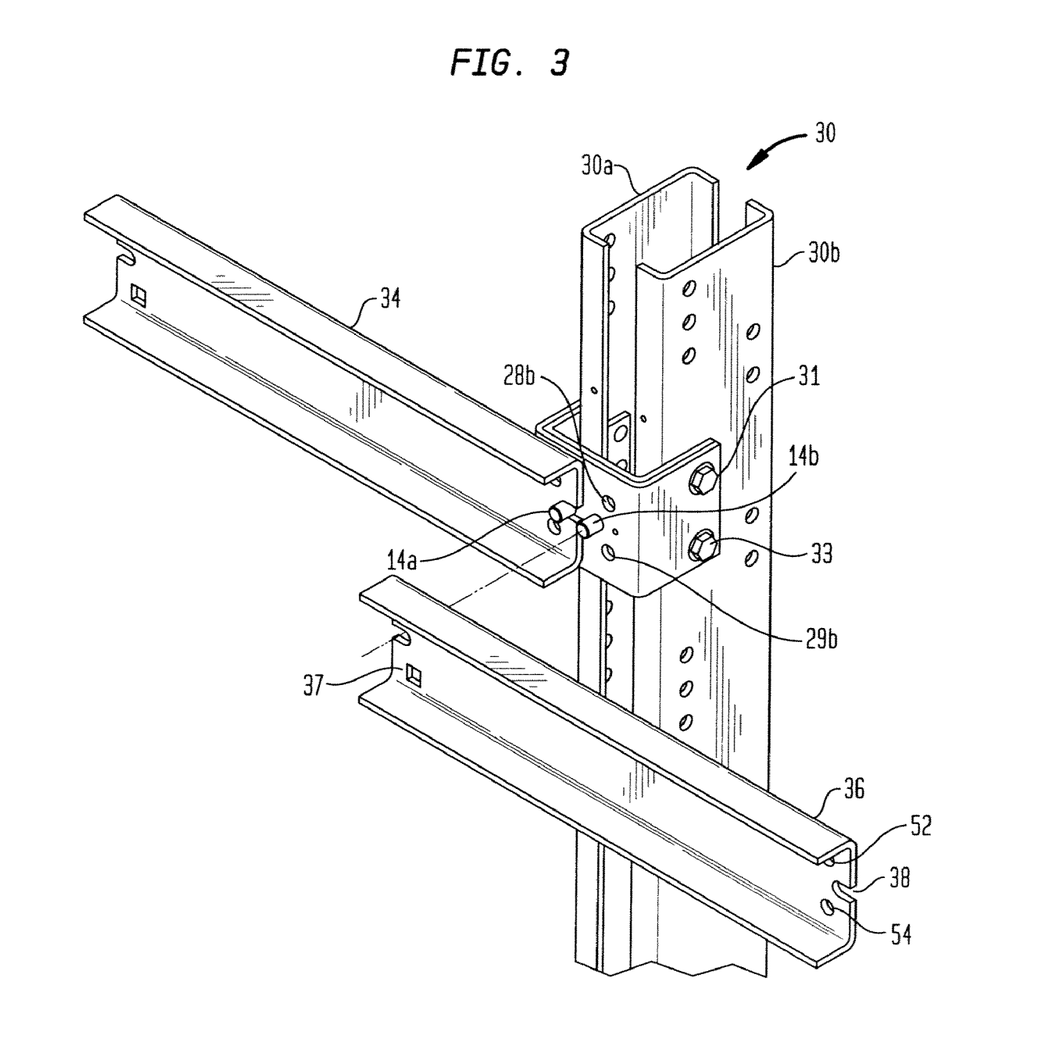
FIG. 3 is an illustration of a step in the assembly of horizontal bus bars on the fixture pins.

As shown in FIG. 3, the horizontal main bus bars 34, 36 have at each end a notch 38 for receiving the fixture pin 14. During installation, each end of the horizontal bus bars 34, 36 is supported by each of the fixture pins 14 at different vertical buses. In FIG. 3, the left bus bar 34 is supported by the fixture pin 14a as well as a corresponding bus joint connector 24. The horizontal bus bar 34 is also supported by a fixture pin 14b (not shown) on an adjacent vertical bus bar (not shown) on the left side of horizontal bus bar 34. Corresponding holes on the ends of each horizontal bus are provided which are aligned by the fixture pins 14 and which extend from the nut plate 15 and the two layers 24a, 24b of the bus joint connector 24. To secure the bus joint connector 24 to the vertical bars, fasteners 31, 33 of the type already disclosed above may be used.

Figure 3A:
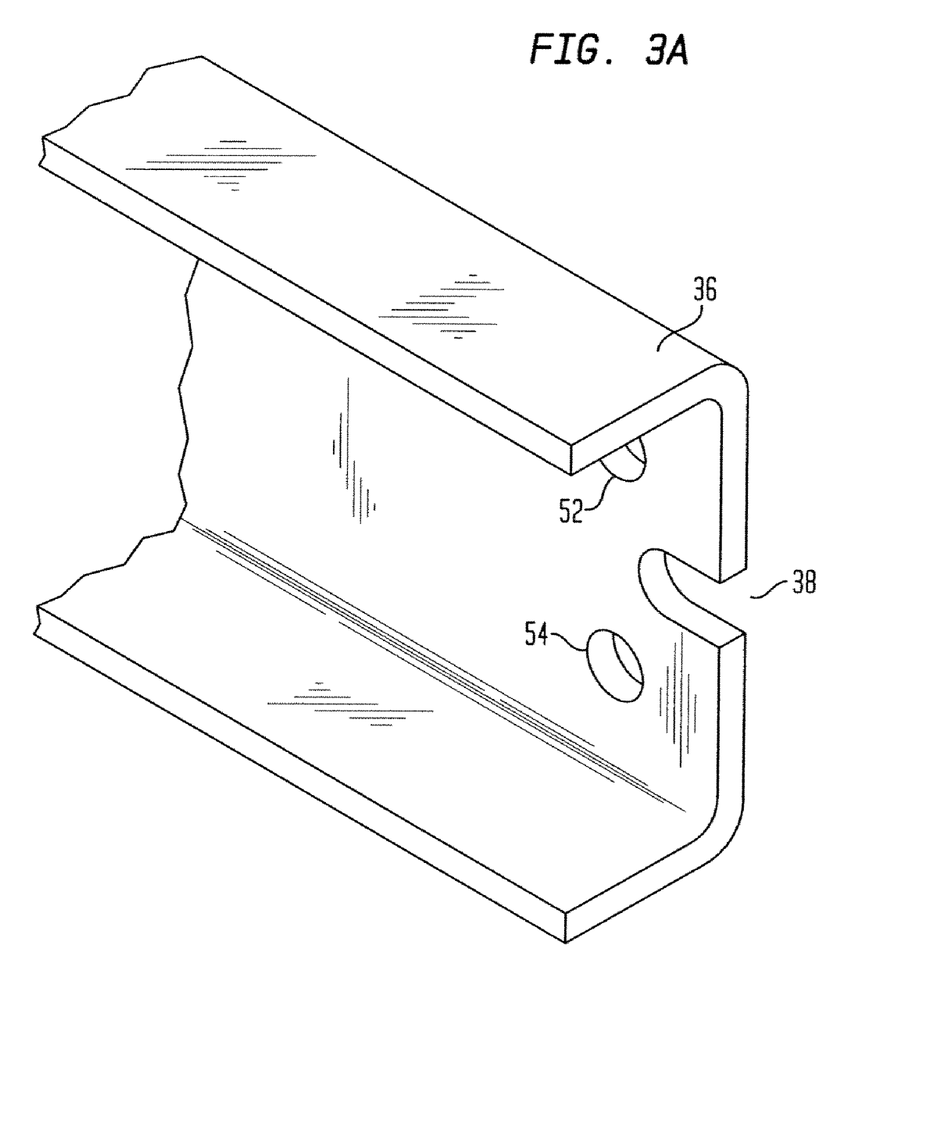
FIG. 3a is a close-up of a notch on one end of a horizontal bus bar.

FIG. 3a shows one end of a horizontal bus bar 36 having a notch 38 on its end. The notch 38 is preferably made such that the opening will accommodate fixture pin 14a with a clearance of about 1/16". Holes 52, 54 on the horizontal bus bar 36 are aligned with the holes 28b and 29b so as to accommodate fastening hardware.

Figure 4:
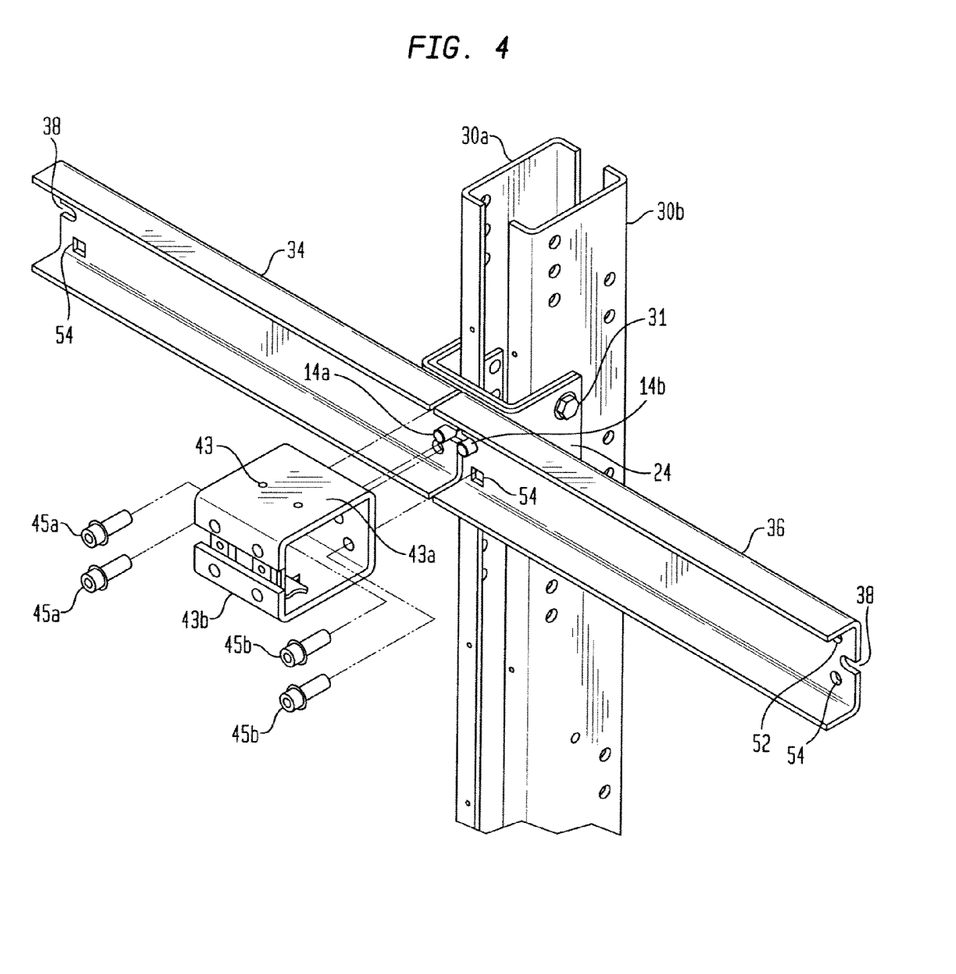
FIG. 4 is an illustration of the use of a splice assembly with associated horizontal bus bars.

In FIG. 4, the horizontal bus bars 34, 36 have been mounted on fixture pins 14a, 14b and are ready for fastening. As previously discussed, the mounting of horizontal bus bars 34, 36 on fixture pins 14a, 14b significantly enhances the assembly process by allowing the horizontal bus bars 34, 36 to be horizontally aligned and supported while splice bus assembly 43 is mounted. Splice bus assembly 43 is preferably a one piece C-shaped bracket insertable between the upper and lower flanges of horizontal bus bars 34, 36. Fixture pins 14a, 14b extend through corresponding holes in the splice bus assembly 43 so as to align the splice bus assembly 43 while assembly is performed. Hardware such as socket head cap screws 45a and 45b are used to secure splice bus assembly 43 to the horizontal bus bars 34, 36 and the vertical bus bars 30a, 30b. Holes through the front and back sides of the splice bus assembly 43 align with corresponding holes 52, 54 as well as holes 29, 28 in the bus joint 24 and holes 19, 18 in the nut plate(s) 15.

Figure 5:
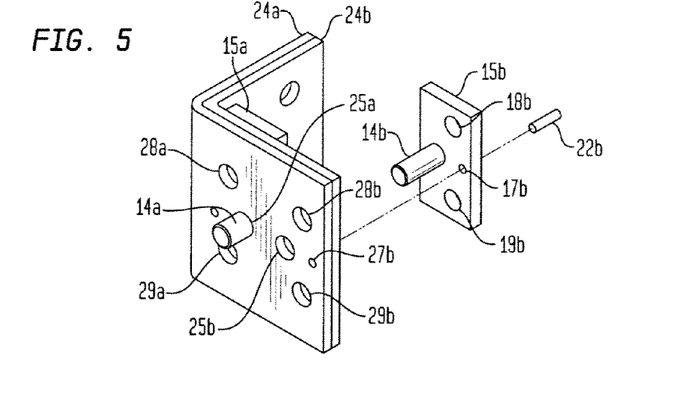
FIG. 5 is an illustration of an L-shaped bus joint connector and associated nut plates, fixture pins and roll pins.

In an alternate embodiment, an L-shaped bus joint connector 24 is shown in FIG. 5. The L shaped bus joint connector 24 is likewise preferably nested or double layered and comprises layers 24a, 24b as in the U shaped bus joint connector 24 shown in FIG. 2, although a single piece configuration may also be used. The same type of removable fixture pin 8 may also be used in the L shaped configuration of the L-shaped bus joint connector 24. In this removable configuration, holes 12a, 12b may be threaded. The L-shaped bus joint 24 may be used in circumstances when for example, a single vertical bus bar 30a is used (see FIG. 6). The L-shaped bus joint 24 is similar to the U-shaped bus joint 24 as shown in FIG. 2,—more specifically, it includes faces 26a, 26b and excludes face 26c.

Figure 6:
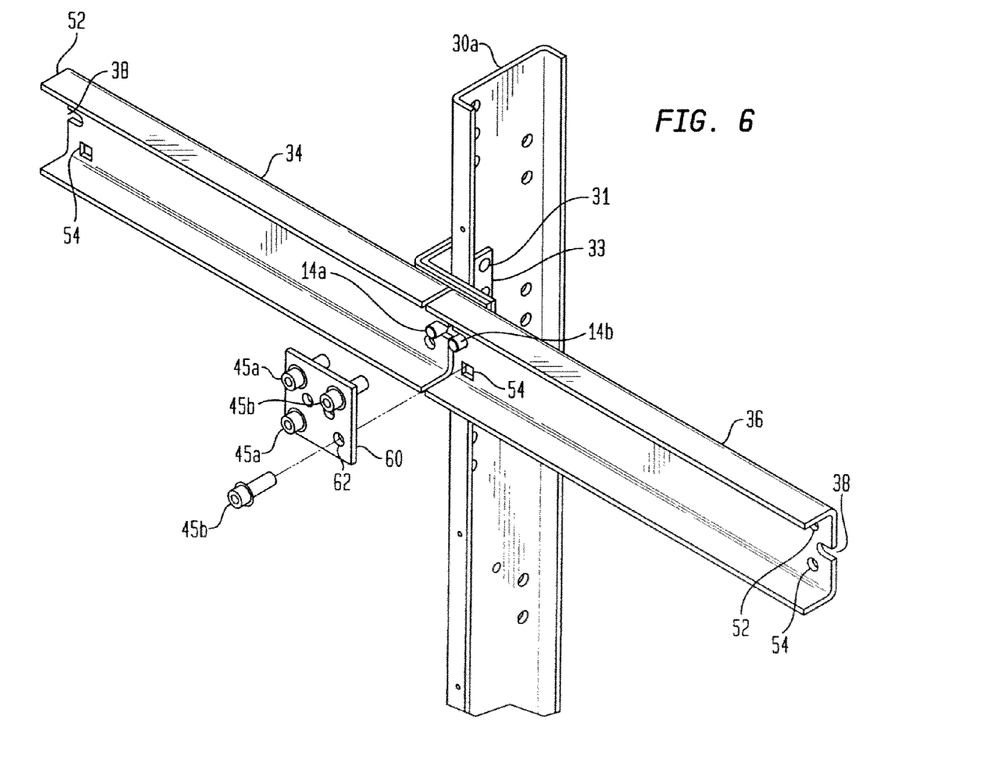
FIG. 6 is an illustration of the installation of horizontal bus bars using an L-shaped bus joint connector and splice plate on a single vertical bus bar.

Shown in FIG. 6 are horizontal bus bars 34, 36 supported in place by fixture pins 14a, 14b. The L-shaped bus joint 24 is mounted on a single vertical bus 30a by fasteners 31, 33. To secure the horizontal bus bars 34. 36, to the bus joint 24, a splice plate 60 is attached to the horizontal bus bars 34, 36 and fastened by fasteners 45a, 45b.

Figure 7:
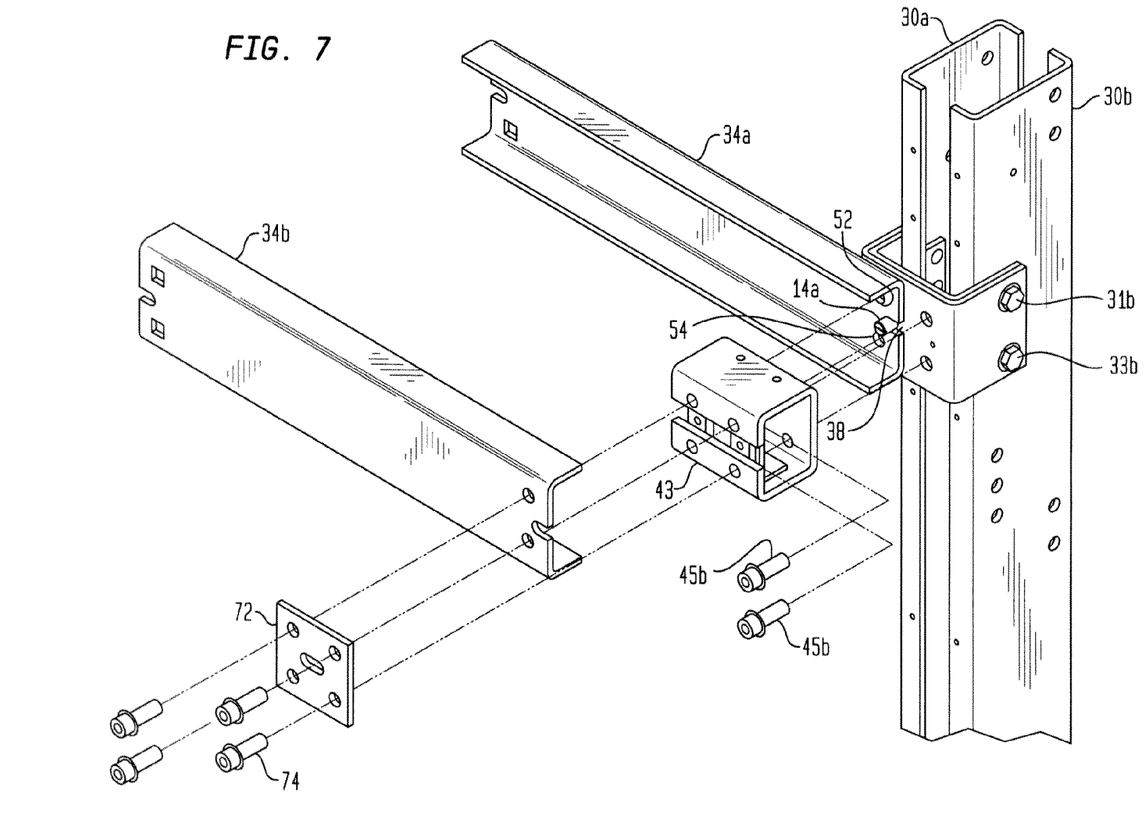
FIG. 7 is an illustration of a double horizontal bus bar configuration.

FIG. 7 shows a horizontal double-bar design which uses the components of FIG. 4 and adds a horizontal bar 34b, nut plate 72 and associated screws or fastening means 74. In this double-bar design, horizontal bus bar 34 comprises a front 34a and a back 34b bus bar. The additional horizontal bus bar 34b (back bar) is fastened to splice assembly 43 by a nut plate (not shown) within splice assembly 43 and by using fastening means such as screws or bolts through the splice plate 72, the corresponding holes in bus bar 34b, splice assembly 43, bus joint connector 24 and nut plate 15. The same double-bar design may also be used on the adjoining bus bar 36.

While the embodiments illustrated in the figures and described above are presently disclosed, it should be understood that these embodiments are offered by way of example only. The bus joint assembly is not intended to be limited to any particular embodiment, but is intended to extend to various modifications that nevertheless flow within the scope of the intended claims. For example, the bus joint assembly can be used with one or two vertical bus bars. The nut plate can be made of a single or two piece design. Moreover, the bus joint assembly can be configured to facilitate use with different shaped bus bars. Other modifications will be evident to those with ordinary skill in the art.

What is claimed is:

1. A bus joint assembly for use with switchgear equipment and for joining bus bars, comprising:
   a bus joint connector having a plurality of holes on the face of the bus joint connector;
   a first nut plate having a first nut plate hole through the face of the first nut plate;
   a first fixture pin insertable through the first nut plate hole in a friction fit, the first fixture pin insertable through and extending beyond one of said plurality of holes of said bus joint connector, and the first fixture pin insertable through a first notch at the end of a first bus bar so that the first fixture pin holds the first bus bar in place; and
   means for joining the bus joint connector to a second bus bar transverse to the first bus bar.

2. The bus joint assembly of claim 1, wherein said bus joint connector is U-shaped.

3. The bus joint assembly of claim 2, wherein said bus joint connector comprises two or more nested bus joint connector layers.

4. The bus joint assembly of claim 1, wherein the first fixture pin comprises a fin for connecting the first fixture pin to the first nut plate in a friction fit.

5. The bus joint assembly of claim 4 wherein the first fixture pin is tapered from the end of the first fixture pin having the fin, to the end extending beyond the bus joint connector.

6. The bus joint assembly of claim 1, further comprising a means for joining the first nut plate to the bus joint connector.

7. The bus joint assembly of claim 6, wherein said means for joining the first nut plate to the bus joint connector comprises a roll pin.

8. The bus joint assembly of claim 1, wherein the bus joint connector is joined to the first nut plate by the first fixture pin, and comprising a second nut plate have a second nut plate hole through the face of the second nut plate, a second fixture pin insertable through the second nut plate hole in a friction fit, the second fixture pin insertable through and extending beyond one of the plurality of holes of the bus joint connector, and the bus joint connector is joined to the second nut plate by the second fixture pin.

9. The bus joint assembly of claim 1 further comprising having a second nut plate having a second hole through the face of the second nut plate, a second fixture pin insertable through the second nut plate hole in a friction fit, the second fixture pin insertable and extending beyond one of the plurality of holes of the bus joint connector, the second fixture pin insertable through a second notch at the end of a third bus bar so that the first and second fixture pins hold both the first bus bar and the third bus bar in place.

10. The bus joint assembly of claim 1, further comprising a splice assembly for connecting the end of the first bus bar and an end of a third bus bar.

11. The bus joint assembly of claim 1, further comprising a splice plate for connecting the end of the first bar and the end of a third bus bar between the nut plate and the splice plate.

12. The bus joint assembly of claim 1, wherein said bus joint connector is electrically conductive.

13. The bus joint assembly of claim 1, wherein said bus joint connector is L-shaped.

14. The bus joint assembly of claim 1, wherein said fixture pin comprises a grooved pin for connecting the grooved pin to the nut plate.

15. A bus joint assembly for use with switchgear equipment and for joining bus bars, comprising:
    a bus joint connector having a plurality of holes on the face of said bus joint connector;

a first nut plate having a first nut plate threaded hole through the face of the first nut plate;

a removal threaded first fixture pin insertable through the first nut plate hole, the first fixture pin insertable through and extending beyond one of said plurality of holes of said bus joint connector, and the first fixture pin insertable through a first notch at the end of a first bus bar so that the first fixture pin holds the first bus bar in place; and means for joining the bus joint connector to a second bus bar transverse to the first bus bar.

16. The bus joint assembly of claim 15, wherein said bus joint connector is U-shaped.

17. The bus joint assembly of claim 15, wherein said bus joint connector comprises two or more nested bus joint connector layers.

18. The bus joint assembly of claim 15, further comprising a means for joining the first nut plate to the bus joint connector.

19. The bus joint assembly of claim 18, wherein said means for joining the first nut plate to the bus joint connector comprises a roll pin.

20. The bus joint assembly of claim 15, wherein the bus joint connector is joined to the first nut plate by the first fixture pin, and comprising a second nut plate have a threaded second nut plate hole through the face of the second nut plate, a removal threaded second fixture pin insertable through the second nut plate hole, the second fixture pin insertable through and extending beyond one of the plurality of holes of the bus joint connector, and the bus joint connector is joined to the second nut plate by the second fixture pin.

21. The bus joint assembly of claim 15 further comprising a second nut plate having a threaded second hole through the face of the second nut plate, a removal threaded second fixture pin insertable through the second nut plate hole, the second fixture pin insertable and extending beyond one of the plurality of holes of the bus joint connector, he second fixture pin insertable through a second notch at the end of a third bus bar so that the fist and second fixture pins hold both the first bus bar and the third bus bar in place.

22. The bus joint assembly of claim 15, further comprising a splice assembly for connecting the end of the first bus bar and the end of a third bus bar.

23. The bus joint assembly of claim 15, further comprising a splice plate for connecting the end of the first bus bar and the end of a third bus bar between the nut plate and the splice plate.

24. The bus joint assembly of claim 15, wherein said bus joint connector is electrically conductive.

25. The bus joint assembly of claim 15, wherein said bus joint connector is L-shaped.

26. A method of joining bus bars used in switchgear equipment with a bus joint assembly, the method comprising the steps of:

fixedly connecting a pin through a hole in a nut plate;

inserting the pin from the nut plate through a hole on a face of a bus joint connector;

connecting the nut plate to the bus joint connector with a means for fastening;

connecting the bus joint connector to a vertical bus bar;

hanging a horizontal bus bar on the fixture pin by inserting said fixture pin through a notch at one end of a horizontal bus bar; and fixedly connecting the end of the horizontal bus bar hanging on the fixture pin between the nut plate and a splice means.

* * * * *